United States Patent [19]

Swanson

[11] 4,404,947
[45] Sep. 20, 1983

[54] VAPOR/AIR CONTROL SYSTEM

[76] Inventor: Wayne A. Swanson, Knights Hill Rd., New London, N.H. 03257

[21] Appl. No.: 241,838

[22] Filed: Mar. 10, 1981

[51] Int. Cl.³ .................... F02M 21/04; F02B 43/00
[52] U.S. Cl. .................................. 123/527; 123/585; 261/50 A; 48/180 C
[58] Field of Search ...................... 123/525, 527, 585; 261/50 A; 48/180 A, 180 C

[56] References Cited

U.S. PATENT DOCUMENTS

| | | |
|---|---|---|
| 2,505,725 | 4/1950 | Shepherd . |
| 2,571,713 | 10/1951 | Hebert . |
| 2,939,776 | 7/1960 | McClain .......................... 261/50 A |
| 2,956,791 | 10/1960 | Johnson ........................... 261/50 A |
| 2,999,674 | 9/1961 | McClain .......................... 261/50 A |
| 3,116,988 | 1/1964 | Lauder . |
| 3,265,374 | 8/1966 | Morton ............................ 261/50 A |
| 3,475,011 | 10/1969 | Cook ................................ 261/50 A |
| 3,630,698 | 12/1971 | Baldwin . |
| 3,651,794 | 3/1972 | Douglas . |
| 3,739,758 | 6/1973 | Knapp et al. ..................... 261/50 A |
| 3,846,094 | 11/1974 | Baverstock . |
| 3,931,798 | 1/1976 | Hoogeboom . |
| 3,970,059 | 7/1976 | Pisar . |
| 4,020,810 | 5/1977 | Baverstock . |
| 4,026,258 | 5/1977 | Ino et al. . |
| 4,106,453 | 8/1978 | Burley . |

Primary Examiner—Charles J. Myhre
Assistant Examiner—E. Rollins Cross
Attorney, Agent, or Firm—Finnegan, Henderson, Farabow, Garrett & Dunner

[57] ABSTRACT

A device to meter and control the flow of a gaseous fuel and air to an internal combustion engine. The portion of the device which controls the flow of gaseous fuel comprises a reservoir chamber linked to a pressurized fuel supply, a plurality of individual chambers equal in number to the number of engine cylinders, demand valves connected to the individual chambers which permit fuel to flow on the intake stroke of each cylinder and valves biased to a closed position between each individual chamber and the reservoir for controlling the flow of gaseous fuel to the individual chambers and a connection for linking the valves to the throttle of the engine to open the valves simultaneously. The portion of the device for controlling air flow to the engine cylinders comprises an air control connected to the engine throttle and to the fuel control portion of the device to regulate entry of the air to the engine manifold and one-way air valves associated with each cylinder to allow air to enter the cylinder on the intake stroke of the cylinder.

16 Claims, 4 Drawing Figures

VAPOR/AIR CONTROL SYSTEM

BACKGROUND

This invention relates to a device to meter the flow of gaseous fuel to an internal combustion engine. In most internal combustion engines, either a carburetor or an electronic fuel injection system is used to supply fuel to the engine cylinders. Both types of devices fail to supply fuel and air in mixtures which are always completely combusted in the engine cylinders. This failure results in the waste of precious fuel and the exhaust of noxious pollutants. Further, emission control systems are required to deal with the pollutants from incompletely combusted fuel thereby adding to the cost of, and increasing the complexity of, the engine.

My invention supplies fuel in a gaseous form and in correctly metered amounts to each individual cylinder of an internal combustion engine, and at the same time provides a precise amount of air to each cylinder. The gaseous fuel delivered in correctly metered amounts and mixed with air according to the engine load demand burns more completely. This provides better fuel economy and at the same time reduces pollution and the need for expensive and complex pollution control devices. By the use of my invention with an internal combustion engine, it is possible to eliminate a fuel pump, carburetor, and emission control system, thereby reducing the complexity and cost of the engine. In addition, the devices which incorporate my invention are of sturdy construction, have few moving parts, and are easily maintained.

The vapor or combination vapor/air control device embodying my invention operates to meter fuel in gaseous forms such as LP gas, hydrogen, gasoline in a gaseous state, etc. The fuel is supplied by either a pressurized fuel tank as in the case of LP or hydrogen gas, or by a system which converts liquid gasoline into a gaseous state. Such conversion systems are well-known in the art and not a part of my invention.

The fuel is supplied under a positive pressure to a reservoir chamber in the vapor control section of the device. The gaseous fuel in the reservoir chamber is metered out to the individual engine cylinders by first passing through valves to individual chambers equal in number to the number of engine cylinders. The fuel exits from the individual chambers either directly by a suction caused by the intake stroke of each cylinder or indirectly by the opening of a demand valve associated with each chamber which also operates by the suction caused by the intake stroke of the cylinder. By a proper correlation of the valves between the reservoir and individual chambers with the throttle, a precise amount of fuel is metered to the individual chambers. This fuel is then released on demand to the cylinder associated with each individual chamber.

In addition to metering the correct amount of fuel to a cylinder, the cylinders must also be supplied with the proper amount of air in order to completely combust the fuel. In order to supply the necessary amount of air, a vapor control device is associated either with an existing carburetor in an internal combustion engine or with an air control unit. If a carburetor is used, it does not perform the function normally associated with it of mixing air and fuel. The function of either the carburetor or the air control unit is to meter or provide air to the intake port of a cylinder. The proper amount of air is supplied to each cylinder on its intake stroke by control via connections to the throttle of the engine and an air flap in the carburetor or air control unit and to a one-way air valve associated with each individual cylinder. The one-way air valve opens on the intake stroke of the cylinder to meter the necessary amount of air to be mixed in the intake port of the cylinder with the fuel delivered by the vapor control unit.

SUMMARY OF THE INVENTION

My invention, as embodied and described herein, provides a means for metering a gaseous fuel and air to the cylinders of an internal combustion engine. It overcomes the problems associated with a conventional carburetor or fuel injection system which results in the inefficient combustion of fuel in the engine cylinders. it thereby increases fuel economy and decreases the amount of pollution created by an engine.

This is accomplished by delivery of a precisely metered amount of fuel in a gaseous state and the delivery of the correct amount of air to an intake port for each cylinder. The fuel and air are mixed in the intake port prior to being introduced into a cylinder. The amounts of fuel and air are determined according to the engine load and are designed to be completely combusted. This eliminates the disadvantages of the standard carburization systems. The vapor or combination vapor/air control device embodying my invention additionally has the advantages of eliminating the problems encountered in carburization systems by which fuel may be transferred from one cylinder to another during the intake stroke of a cylinder. The unique metering system for fuel and air does not provide fuel or air to each cylinder until its intake stroke. At that point only the correct amount of fuel and air, as dictated by the engine load, is delivered to the cylinder intake port. One cylinder cannot pull excess fuel from another cylinder or from a common fuel line such as a manifold as occurs in systems using a carburetor for fuel injection.

Both the fuel and the air necessary for the complete combustion of the fuel in the engine cylinders are provided by separate systems and mixed at the inlet port to the cylinders. In order that the air is delivered in adequate amounts to completely combust the fuel an interconnection between the fuel metering device and the air control device is essential to control the amount of air in the mixture to be combusted.

To achieve the objects and in accordance with the purposes of the invention, as embodied and broadly described herein, the vapor control unit used to control the flow of a gaseous fuel to an internal combustion engine, which has a plurality of cylinders comprises: a reservoir having an inlet for receiving gaseous fuel under positive pressure, a plurality of chambers equal in number to the number of engine cylinders, the chambers each being in fluid communication with the reservoir means for separately connecting the chambers to individual ones of the cylinders, individual valve means each biased to a closed position for controlling the fluid communication between the chambers and the reservoir means connectable to the throttle of the engine for simultaneously opening the valve means against their bias and means connectable to air control apparatus regulating the flow of air to said engine.

The portion of the device responsible for controlling the flow of air to the cylinders of an internal combustion engine comprises an intake means connectable to the throttle of the engine and also connectable to the valve means of the vapor control unit for regulating the flow of air to one-way air valves associated with each individual cylinder of an internal combustion engine.

DESCRIPTION OF THE PREFERRED EMBODIMENT

Figure 1:
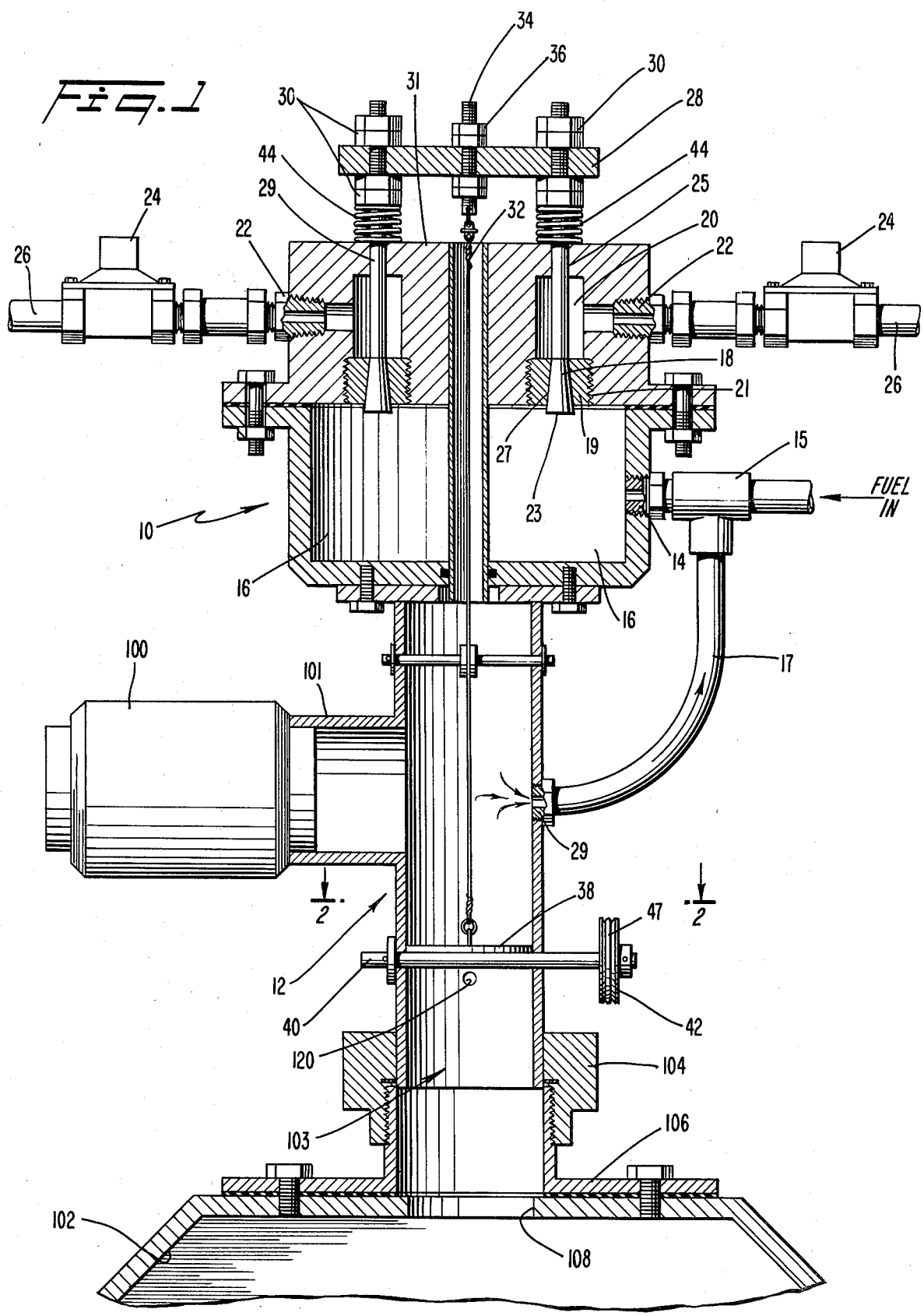
FIG. 1 is a cross-sectional view through a vapor control unit and an air control unit of the invention.

Reference will now be made in detail to the present preferred embodiment of the invention, an example of which is illustrated in the accompanying drawings. The preferred embodiment of the vapor control unit is shown in FIG. 1 and is represented generally by 10. The air control unit is generally referred to by 12. In operation, the vapor control unit receives fuel in a gaseous form under positive pressure through inlet 14 into a reservoir 16. The reservoir 16 functions to maintain a sufficient supply of fuel for metering to the engine.

Fuel in the reservoir 16 is metered by valves 18 to individual chambers 20. Valves 18 are comprised of valve seats 19, secured in ports 21 between the reservoir 16 and individual chambers 20, and valve seals 23. Each valve seal 23 has a frusto-conical shaped end 27 proximate the reservoir 16, a rod-shaped shaft 29 passing through a respective chamber 20 and channel 25 in the wall of chamber 20, and has an opposed threaded other end. The length of the tapered portion of the frusto-conical portion, the shaft and the rod-shaped end of each valve seal 23 will vary depending on the size of the engine and thus on the desired flow requirements. The number of valves 18 and associated individual chambers 20 are equal in number to the number of cylinders in the internal combustion engine with which the vapor control unit is used. Gaseous fuel exits the individual chambers 20 through outlets 22 in response to the opening and closing of demand valves 24, individually associated with each chamber 20. Each demand valve 24 supplies the gaseous fuel through line 26 to a respective engine cylinder intake port.

I have determined that the problem of directing fuel to a single cylinder and preventing other cylinders from pulling excess fuel from elsewhere in the engine is more severe in engines which have more than four cylinders. Therefore, on engines of four cylinders or less, it is possible to eliminate the demand valves 24 in the fuel lines running from the individual chambers 20 to the cylinders. In this case, it is necessary only to have one demand valve positioned at inlet 14.

In order to precisely meter the amount of fuel necessary for the proper combustion by the engine, the valves 18 which meter fuel from the reservoir 16 to the individual chambers 20 all are open and closed together in response to a connection to the engine throttle. As shown in FIG. 1, each valve stem passes through and is adjustably secured to plate 28 by nuts 30. Plate 28 is adjustably secured to cable 32 by means of a threaded rod 34 and adjusting nuts 36. The cable 32 is attached at its opposite end to air flap 38 in air control unit 12. The air flap pivots about shaft 40 which is secured to drum 42. Cable 47 operatively interconnects drum 42 to the engine throttle.

Figure 2:
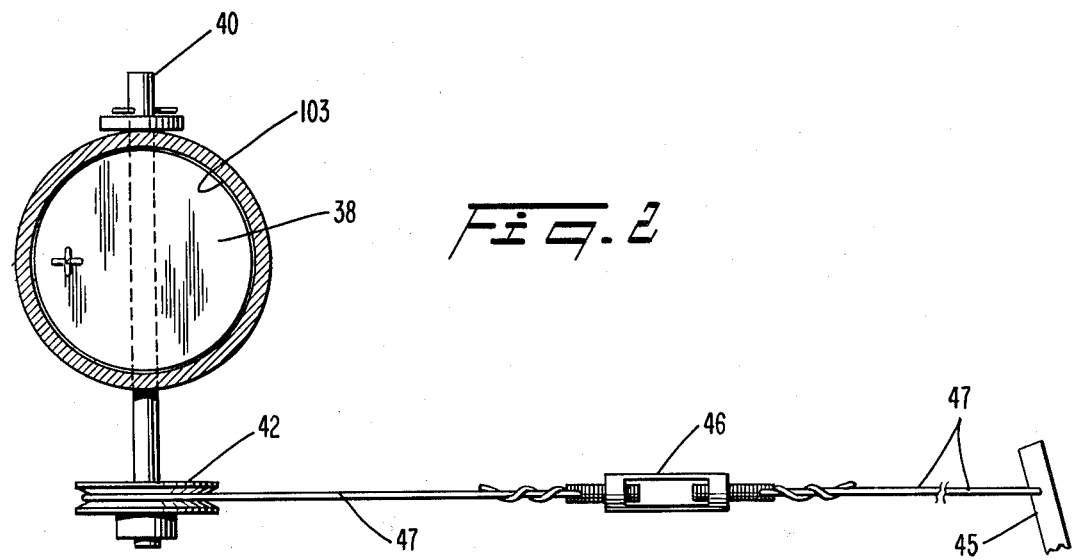
FIG. 2 is a section AA taken through the FIG. 1 showing an air flap utilizable with the invention.

In order to close off the supply of fuel to the demand valve 24 and engine, the valves 18 are biased in a closed position by springs 44 disposed around shafts 29 between plate 28 and wall 31 of chamber 20. Turnbuckle 46 on throttle cable 47 (FIG. 2), permits engine idle adjustment after installation of the vapor control unit. In combination with adjustments to adjusting nuts 36 and 30, the idle adjustment by turnbuckle 46 maintains air flap 38 in a slightly open position and thereby pulls down a cable 32 because of the offset position of the cable attached to the air flap as is best shown in FIG. 2. Valves 18 are adjusted accordingly and maintain a slightly open position to supply fuel to the demand valve. Adjustments are made to provide for the correct amounts of fuel and air for clean, efficient burning of all the fuel supplied to the engine cylinders by means of adjusting nuts 30 for valves 18 and by nuts 36 on threaded rod 34.

As shown in FIG. 1, air control unit 12 has air filter 100 in fluid communication with air intake 101 and has orifice 103 for supplying metered amounts of air to the intake manifold 102 of the engine. Air entering the air control unit through the air filter 100 passes through air flap 38 in response to its opening and closing. The air flap position is regulated by the engine throttle. As shown in FIG. 1, the air control unit is secured to the intake manifold by means of coupling 104 which is affixed to bracket 106 mounted directly over opening 108 on the manifold 102.

In order to adapt an engine with an existing carburetor for use with the vapor control unit of the invention, the fuel connections to the carburetor are eliminated, and the fuel is directed to the vapor control unit. The carburetor is used solely to meter air to the air manifold, thus performing the same function as the air control unit described.

Distributor vacuum advance 120 is positioned below air flap 38 and is operatively connected to a distributor (not shown) to advance or retard the spark in response to engine load. This is used when applicable to the type of distributor with which the engine is equipped. In some instances it is not necessary since some distributors are of the centrigual advance type and have no need for a connection with the air intake portion of the engine.

Figure 4:
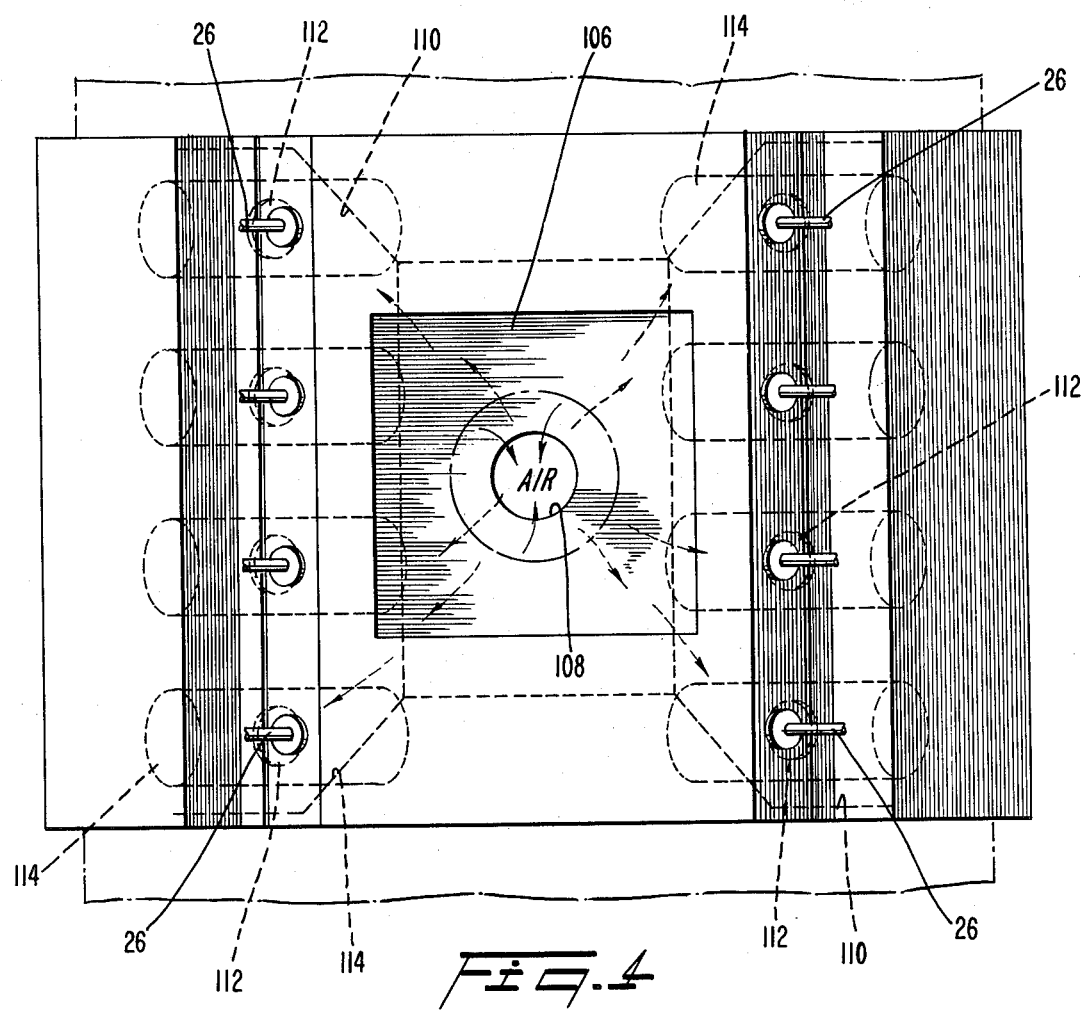
FIG. 4 is a diagrammatic view of the air delivery system of the invention in an internal combustion engine.

As shown in FIG. 4, air entering the intake manifold 102 passes through the inlet channels 110 to each cylinder. As depicted in this figure of an 8-cylinder engine, there are 8 separate passageways 110, leading to the 8 individual cylinders. Associated with the entry port for each cylinder is a one-way air valve 112.

In operation, the intake stroke of a cylinder creates a suction which opens the one-way air valve 112 to admit air from each passage 110 to the respective cylinder intake port. At the same time, the suction created by the cylinder intake stroke opens a respective demand valve 24 and pulls gaseous fuel through line 26 into the respective cylinder. Since all of the valves 18 in the vapor control unit operate in unison, there is always a supply of fuel available in individual chambers 20 to feed any individual engine cylinder. However, fuel in appropriate amounts in only released to a cylinder by the demand valves 24. The individual valves 18 control the rate at which gaseous fuel flows through the vapor control unit to the demand valves and thus control the amount of the fuel which is permitted to flow to the engine when the demand valve is open on the intake stroke of a cylinder. Alternatively, when only a single demand valve is used at the inlet 14, the suction from the intake stroke of each cylinder acts through the fuel line 26, the individual chamber 20 and the reservoir 16 to open the demand valve to allow the necessary amount of fuel into the reservoir and direct it to the cylinder creating the demand.

Figure 3:
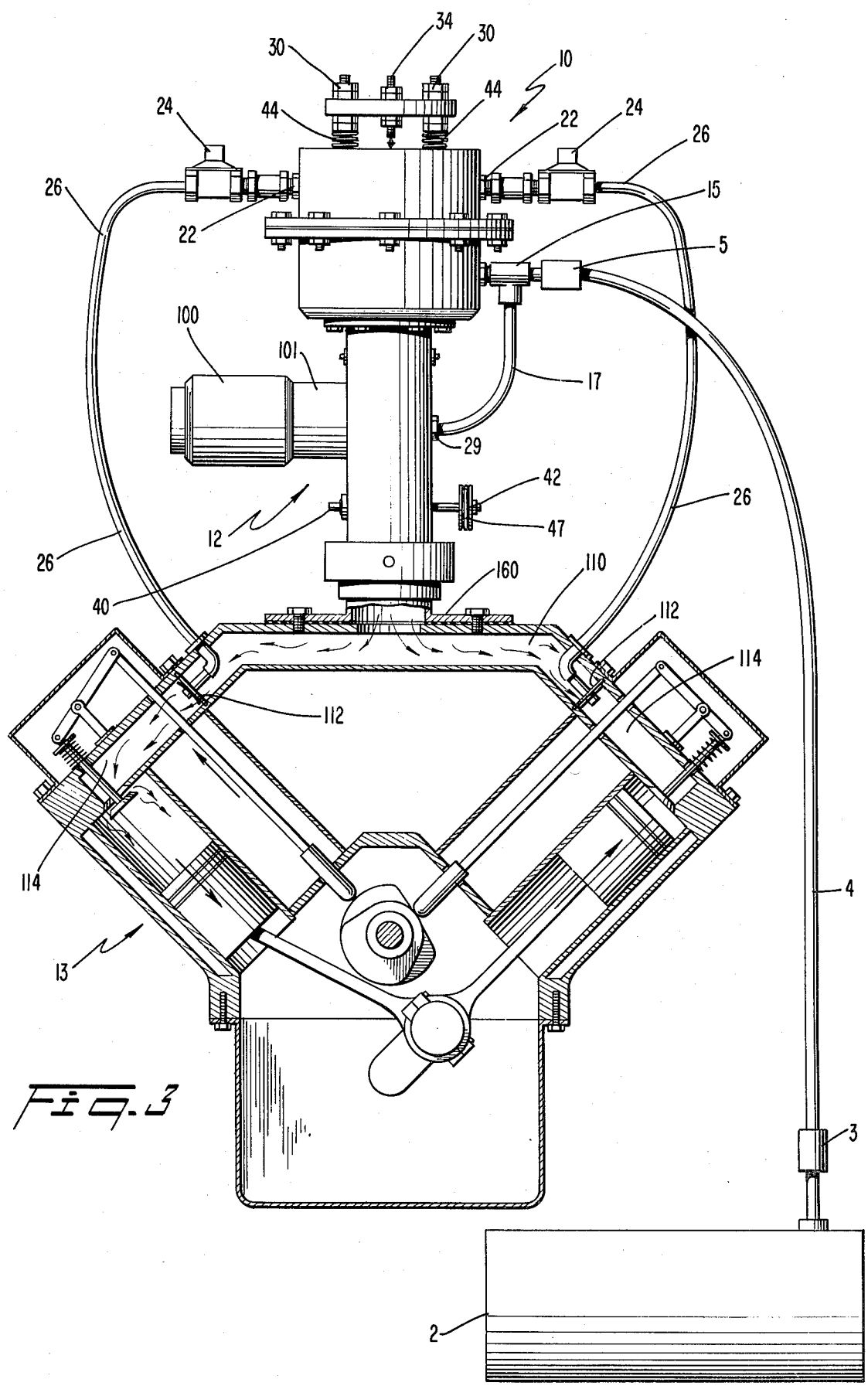
FIG. 3 is a schematic drawing showing an engine system incorporating the device of the invention.

As shown in FIG. 3, the vapor control unit 10 and the air control unit 12 are mounted on an internal combustion engine 13. The air control unit 12 is in direct fluid communication with manifold 102. The vapor control unit is connected to a fuel tank. FIG. 3 illustrates use of the device with a liquid fuel which becomes gaseous upon its expansion, such as LP gas. Fuel is released from tank 2 through a pressure regulator 3 and fuel line 4 to a second pressure regulator 5 which supplies gaseous fuel at a positive pressure to inlet 14 of vapor control unit 10. The pressure necessary depends upon engine displacement and the size of openings in the individual valves 18 but pressures in the range of 15 to 25 psi have been found acceptable. Both pressure regulators may be adjustable to control the delivery pressure of the fuel. For fuel such as gasoline, which is liquid at atmospheric pressure, a conversion system is used to produce a gaseous form and to supply it under pressure.

Also positioned at inlet 14 is a "T" fitting 15 connected to air line 17 which provides air from above the air flap 38 through fitting 29 in the air control unit or carburetor. The introduction of a small amount of air at this point is necessary to alleviate the large negative pressure which is produced by the engine, especially at start-up and which would tend to cause the demand valve to stay open continually. In order to introduce the appropriate amount of air, air line 17 to fitting 15 has a valve with an adjustment such as a variable opening to restrict the flow of air and if a demand valve is used it also is adjustable to provide fuel in response to a predetermined level of suction. If a demand valve is not positioned in fluid communication between inlet 14 and the fuel tank, as for example in the 8 cylinder engine of FIG. 3, air line 17 is still necessary to eliminate the large negative engine pressure which otherwise acts on the one-way air valves. Although this air fitting introduces a small amount of air into the gaseous fuel entering the reservoir 16, it does not supply sufficient air to make a mixture which is completely combustible in accordance with this invention. If a demand valve is not used, some type of fuel shut-off valve must be used in the fuel line.

Air filter 100 is in fluid communication with air control unit 12 at a position above air flap 38. The air flap is controlled by connection to cable 47 and throttle control 45. Upon operation of the throttle, as shown in FIG. 1, the air flap opens to admit air to the manifold and pulls on valve 32 which operates the valves of the vapor control unit to release fuel to the individual chambers 20. Fuel in the individual chambers exits through a fuel lne 26 and demand valve 24, in response to the intake stroke of a cylinder. Demand valves 24 may be positioned either adjacent the vapor control unit or elsewhere along the line between exit from the individual chambers in the vapor control unit and the cylinder inlet port. Air is pulled into the cylinder inlet port 114 from the manifold through one-way valves 112 and fuel enters from line 26 and demand valves 24 to be mixed with the air in the inlet port prior to entering the cylinder.

It will be apparent to those skilled in the art that various modifications and variations can be made in the vapor control unit without departing from the scope or spirit of the invention. Thus, it is intended that the present invention cover modifications and variations of this invention provided they come within the scope of the appended claims and their equivalents.

What is claimed is:

1. A device for controlling the flow of a gaseous fuel to an internal combustion engine, said engine having a plurality of cylinders, and operable in conjunction with apparatus to control the flow of air to said cylinders comprising:
   (a) a reservoir having an inlet for receiving gaseous fuel under pressure;
   (b) a plurality of chambers equal in number to the number of said cylinders, each of said chambers being in individual fluid communication with said reservoir;
   (c) means for separately connecting each of said chambers to a respective one of said cylinders;
   (d) individual valve means biased to a closed position for controlling the fluid communication between said chambers and said reservoir;
   (e) means connected with the throttle of said engine for simultaneously opening said valve means against said bias in response to actuation of said throttle; and
   (f) means connectable with said air control apparatus for regulating the flow of air to said engine.

2. The device of claim 1 wherein the means for separately connecting said chambers to said cylinders comprise outlets to said chambers and a line capable of conducting gaseous fuel connected to each of said outlets.

3. The device of claim 1 wherein the individual valve means comprise ports between said reservoir and said individual chambers, valve seats located in said ports and valve seals for controlling fluid flow through said valve seats.

4. The device of claim 3 wherein said valve seals are rods each having one frusto-conical shaped end for seating in said valve, seats to form a fluid tight seal and one end adapted as an adjustment mechanism to control the seating of the frusto-conical shaped end.

5. The device of claim 4 wherein the adjustment mechanism comprises a spring surrounding the upper end of each of said valve seals, adjusting nuts on each valve seal and a plate having holes aligned with the ends of said valve seals, said valve seals passing through said plate and supporting said plate between the adjusting nuts.

6. The device of claim 5 wherein said means connectable to the throttle comprises a plate with holes registering with valve seal ends of said individual valve means, means for securing said plate to said valve seal ends, and a cable attached to said plate.

7. The device of claim 6 wherein the means for securing said plate to said valve seal ends is a threaded portion of said valve seat and an adjustment nut on said valve seal end below said plate and an adjustment nut on said valve seal above said plate.

8. The device of claim 7 including an adjustable linkage for attaching the cable to said plate.

9. The device of claim 8 wherein the adjustable linkage comprises a plate having a hole, a threaded rod secured in said hole by nuts on said rod above and below said plate and a fitting on one end of the rod to which a cable may be secured.

10. The device of claim 6 wherein said means connectable with said air control apparatus is said cable.

11. The gaseous fuel control device of claim 1 including means for separately regulating and delvering air to the cylinders of an internal combustion engine having a plurality of cylinders, said means comprising:
    (a) an intake manifold on said engine, said manifold having an opening through which it may admit air;
    (b) an air flap to control the admission of air through said opening, said air flap being connectable to the throttle of said engine and connectable to said fuel control device; and
    (c) air conduits from said manifold to said cylinders.

12. The device of claim 11 wherein the opening to the intake manifold has positioned about it a fitting which is substantially airtight and connectable to a conduit containing the air flap means.

13. The device of claim 11 wherein the air flap means is a plate, mounted on a rotatable shaft in an air inlet conduit connectable to said manifold and positioned so that the rotation of said shaft causes the air flap to open and close.

14. The device of claim 13 wherein the rotatable shaft has a drum at one end, said drum supporting a cable connectable to said throttle.

15. The device of claim 13 wherein said plate has secured to it a cable connectable to said fuel regulating device.

16. A device for controlling the flow of gaseous fuel to an internal combustion engine utilizing a plurality of cylinders which engine operates on a mixture of said gaseous fuel and air, comprising:
    (a) a reservoir having an inlet for receiving a pressurized gaseous fuel;
    (b) a plurality of chambers equal in number to said plurality of cylinders, said chambers being in individual fluid communication with said reservoir;
    (c) each chamber having an outlet each said outlet connected to a line capable of conducting gaseous fuel to an individual cylinder;
    (d) individual valve means biased to a closed position for controlling communication of said gaseous fuel from said reservoir to said individual chambers;
    (e) means connectable with the throttle of the engine for simultaneously opening said valve means against said bias; and
    (f) means connectable with an air control device said air control device metering air to be mixed with said fuel.

* * * * *